(12) United States Patent
Fredlund et al.

(10) Patent No.: US 8,724,159 B2
(45) Date of Patent: May 13, 2014

(54) IDENTIFYING A PREVIOUSLY MARKED SHEET

(75) Inventors: John Randall Fredlund, Rochester, NY (US); Chen Quan, Singapore (SG)

(73) Assignee: Eastman Kodak Company, Rochester, NY (US)

( * ) Notice: Subject to any disclaimer, the term of this patent is extended or adjusted under 35 U.S.C. 154(b) by 208 days.

(21) Appl. No.: 13/327,820

(22) Filed: Dec. 16, 2011

(65) Prior Publication Data

US 2013/0155469 A1   Jun. 20, 2013

(51) Int. Cl.
*G06K 15/00* (2006.01)
*H04N 1/46* (2006.01)
*B65H 5/00* (2006.01)

(52) U.S. Cl.
USPC .................. 358/1.18; 358/538; 271/10.04

(58) Field of Classification Search
USPC ............... 358/1.18, 1.9, 3.26, 1.14, 462, 463; 271/288, 10.04, 4.03; 347/14, 4, 2; 400/76

See application file for complete search history.

(56) References Cited

U.S. PATENT DOCUMENTS

| 6,236,831 | B1 | 5/2001 | Mei et al. |
| 7,066,460 | B2 * | 6/2006 | Asao ..................... 271/10.04 |
| 7,350,902 | B2 | 4/2008 | Dietl et al. |
| 7,782,508 | B2 * | 8/2010 | Kondo .................... 358/538 |

* cited by examiner

*Primary Examiner* — Barbara Reinier
(74) *Attorney, Agent, or Firm* — Peyton C. Watkins

(57) ABSTRACT

A method of printing on a sheet of recording medium included in a randomly oriented stack of recording media provided to a printing apparatus, the method comprising: a) using a scanning element disposed in a printing path of the printing apparatus to scan a first side of the sheet of recording medium to provide scan data; b) analyzing the scan data to determine whether the first side has previously been marked on; and c) making a predetermined indicator on the first side of the sheet of recording medium if it is determined that the first side has previously been marked on.

20 Claims, 8 Drawing Sheets

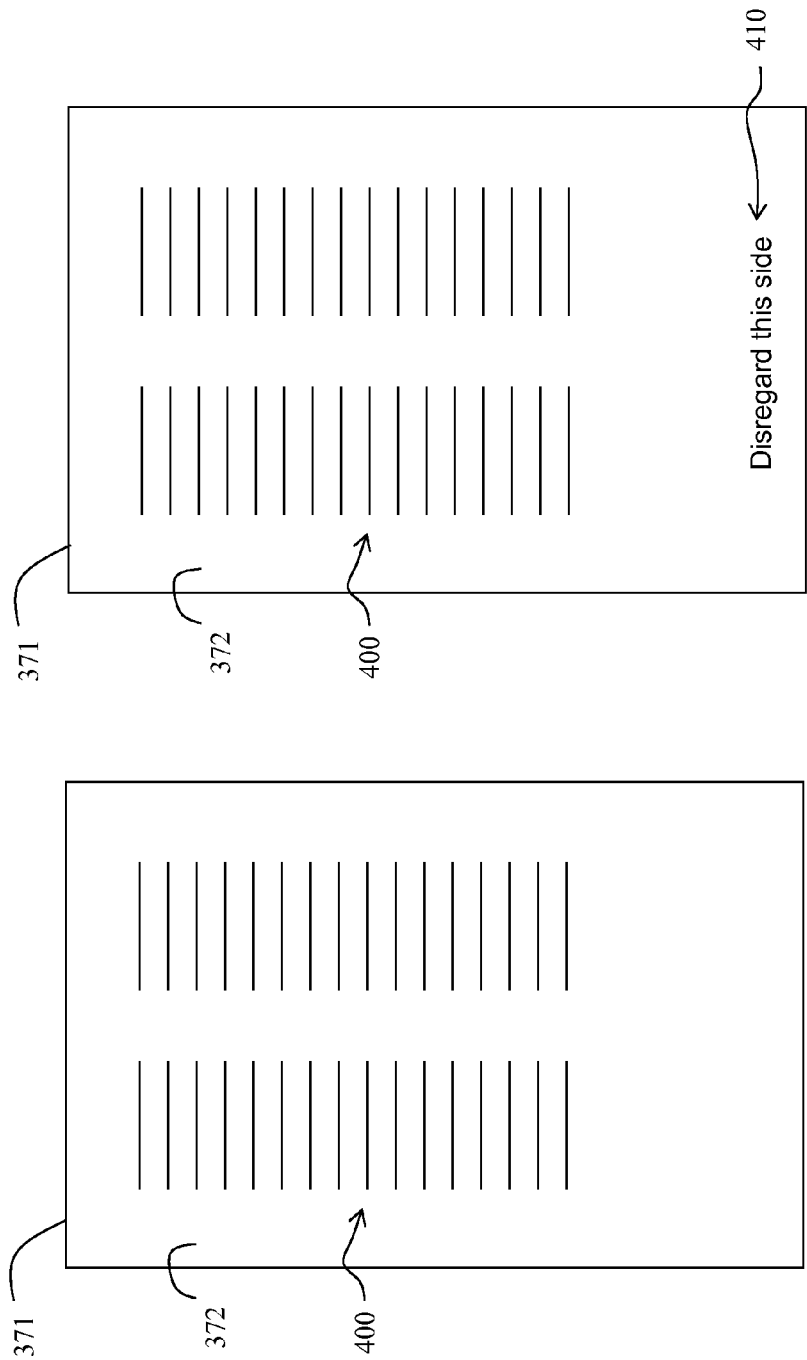

IDENTIFYING A PREVIOUSLY MARKED SHEET

CROSS REFERENCE TO RELATED APPLICATIONS

Reference is made to commonly assigned U.S. patent application Ser. No. 13/327,813 filed Dec. 16, 2011 by Chen Quan and Robert Cloutier, entitled "Sorting a Media Stack Using a Printer"; U.S. patent application Ser. No. 13/327,809 filed Dec. 16, 2011 by Chen Quan, entitled "Printing on a Randomly Ordered Stack of Media"; and U.S. patent application Ser. No. 13/327,828 filed Dec. 16, 2011 by Gary Kneezel, entitled "Sorting a Media Stack Using a Scanning Apparatus"; the disclosures of which are herein incorporated by reference.

FIELD OF THE INVENTION

The present invention relates generally to a method and apparatus for reusing print media, and more particularly to scanning of print media within the printing path to determine whether a side of the print media has previously been marked.

BACKGROUND OF THE INVENTION

There are many different types of sheet-fed printers used in home and office settings. Such printers typically include a printing path including a print media input holder, a print region, and a printing mechanism. As an example, printing mechanisms can include a printhead, such as an inkjet printhead, that deposits marking material on a sheet of recording medium. Such printheads can span the width of the recording medium, so that printing is done a line at a time. Alternatively, such printheads can be shorter than the recording medium, and are moved by a carriage across the recording medium to print an image a swath at a time. As another example, a printing mechanism can include an energy source, such as a laser, which selectively modifies a surface such that toner particles can be attracted to the surface in an image-wise fashion for subsequent transfer to a sheet of recording medium.

In the past, home or office printing was predominantly done on one side of a sheet of recording medium, and then the sheet was discarded when the printed image was no longer needed. For types of recording media where both sides of the sheet are usable, this represents significant waste. More recently, many printers have included duplexing units so that the user could readily print on both sides of a sheet. Still there are many sheets being printed only on one side.

Increasingly, users of printed media in home and office settings have become environmentally conscious and now recycle printed media. A standard type of recycling is to store up printed media that is no longer needed and send it to a processing center where the waste paper is recovered and remade into new paper products. Recycling of one ton of office or copier paper saves about two tons of wood, reducing the need to cut down trees for paper making. An even more environmentally friendly and cost-conscious measure is to reuse paper that has been printed on. U.S. Pat. No. 6,236,831 discloses scanning a previously printed marking surface, determining a location of printing on the marking surface, and depositing an erasing material, such as an opaque white material or a bleaching compound to conceal or remove marks that were previously made. Most printers, however, do not have the capability for depositing an opaque white material or bleaching compound.

An alternative approach is to reuse recording medium that has previously been printed on one side but not on the other side. A user can remove paper from a recycling storage unit, load it into a printer and print on the side that was not previously marked on. A difficulty with this approach is that recording medium in a recycling storage unit is typically not stored in an ordered fashion with the blank sides facing in a uniform direction, but rather is randomly oriented. The user typically needs to manually sort the stack of recording medium before loading it into the printer.

What is needed is a method of providing an indicator on a previously marked on side of sheet of recording medium included in a randomly oriented stack of recording media in order to indicate that the side with the indicator is not the side containing newly printed content.

SUMMARY OF THE INVENTION

A method of printing on a sheet of recording medium included in a randomly oriented stack of recording media provided to a printing apparatus, the method comprising: a) using a scanning element disposed in a printing path of the printing apparatus to scan a first side of the sheet of recording medium to provide scan data; b) analyzing the scan data to determine whether the first side has previously been marked on; and c) making a predetermined indicator on the first side of the sheet of recording medium if it is determined that the first side has previously been marked on.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein:

FIG. 8A shows a side of a sheet of recording medium that has previosuly been marked on; and FIG. 8B shows the sheet of FIG. 8A with a predetermined indicator printed on the marked side according to an embodiment of the invention.

DETAILED DESCRIPTION OF THE INVENTION

Figure 1:
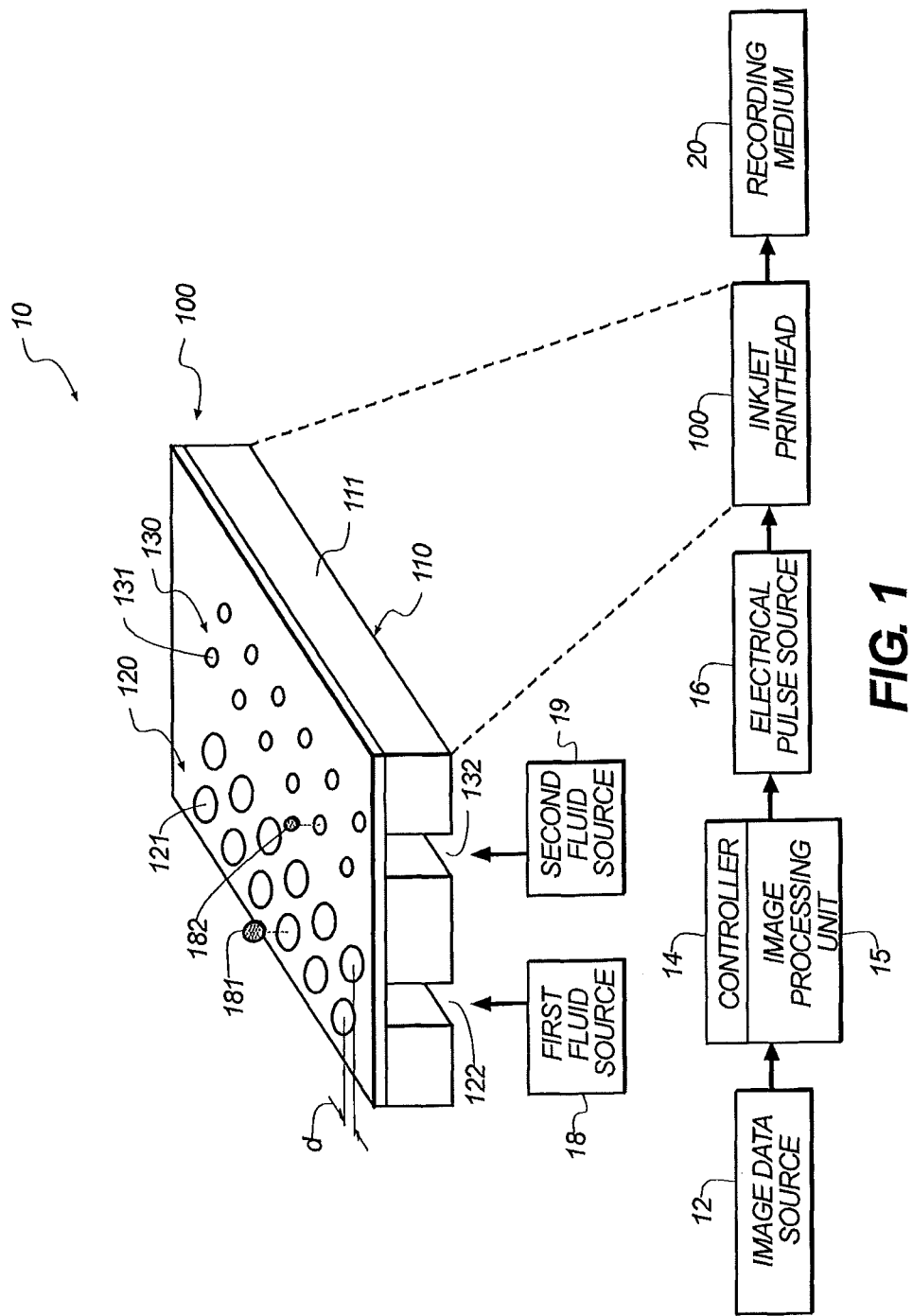
FIG. 1 is a schematic representation of an inkjet printer system.

Referring to FIG. 1, a schematic representation of an inkjet printer system 10 is shown, for its usefulness with the present invention and is fully described in U.S. Pat. No. 7,350,902, and is incorporated by reference herein in its entirety. Inkjet printer system 10 includes an image data source 12, which provides data signals that are interpreted by a controller 14 as being commands to eject drops. Image data can include data corresponding to text, graphs, pictures, or other kinds of image content. Controller 14 includes an image processing unit 15 for rendering images for printing, and outputs signals to an electrical pulse source 16 of electrical energy pulses that are inputted to the inkjet printhead 100, which includes at least one inkjet printhead die 110.

In the example shown in FIG. 1, there are two nozzle arrays. Nozzles 121 in the first nozzle array 120 have a larger opening area than nozzles 131 in the second nozzle array 130. In this example, each of the two nozzle arrays 120, 130 has two staggered rows of nozzles, each row having a nozzle density of 600 per inch. The effective nozzle density then in each array is 1200 per inch (i.e. d=1/1200 inch in FIG. 1). If pixels on the recording medium 20 were sequentially numbered along the paper advance direction, the nozzles from one row of an array would print the odd numbered pixels, while the nozzles from the other row of the array would print the even numbered pixels.

In fluid communication with each nozzle array 120, 130 is a corresponding ink delivery pathway 122. Ink delivery pathway 122 is in fluid communication with the first nozzle array 120, and an ink delivery pathway 132 is in fluid communication with the second nozzle array 130. Portions of ink delivery pathways 122 and 132 are shown in FIG. 1 as openings through printhead die substrate 111. One or more inkjet printhead die 110 will be included in inkjet printhead 100, but for greater clarity only one inkjet printhead die 110 is shown in FIG. 1. In FIG. 1, a first fluid source 18 supplies ink to first nozzle array 120 via ink delivery pathway 122, and a second fluid source 19 supplies ink to second nozzle array 130 via ink delivery pathway 132. Although distinct fluid sources 18 and 19 are shown, in some applications it can be beneficial to have a single fluid source supplying ink to both the first nozzle array 120 and the second nozzle array 130 via ink delivery pathways 122 and 132 respectively. Also, in some embodiments, fewer than two or more than two nozzle arrays 120, 130 can be included on printhead die 110. In some embodiments, all nozzles 121, 131 on inkjet printhead die 110 can be the same size, rather than having multiple sized nozzles 121, 131 on inkjet printhead die 110.

Not shown in FIG. 1, are the drop forming mechanisms associated with the nozzles 121, 131. Drop forming mechanisms can be of a variety of types, some of which include a heating element to vaporize a portion of ink and thereby cause ejection of a droplet, or a piezoelectric transducer to constrict the volume of a fluid chamber and thereby cause ejection, or an actuator which is made to move (for example, by heating a bi-layer element) and thereby cause ejection. In any case, electrical pulses from electrical pulse source 16 are sent to the various drop ejectors according to the desired deposition pattern. In the example of FIG. 1, droplets 181 ejected from the first nozzle array 120 are larger than droplets 182 ejected from the second nozzle array 130, due to the larger nozzle opening area. Typically other aspects of the drop forming mechanisms (not shown) associated respectively with nozzle arrays 120 and 130 are also sized differently in order to optimize the drop ejection process for the different sized drops. During operation, droplets of ink are deposited on a recording medium 20.

Figure 2:
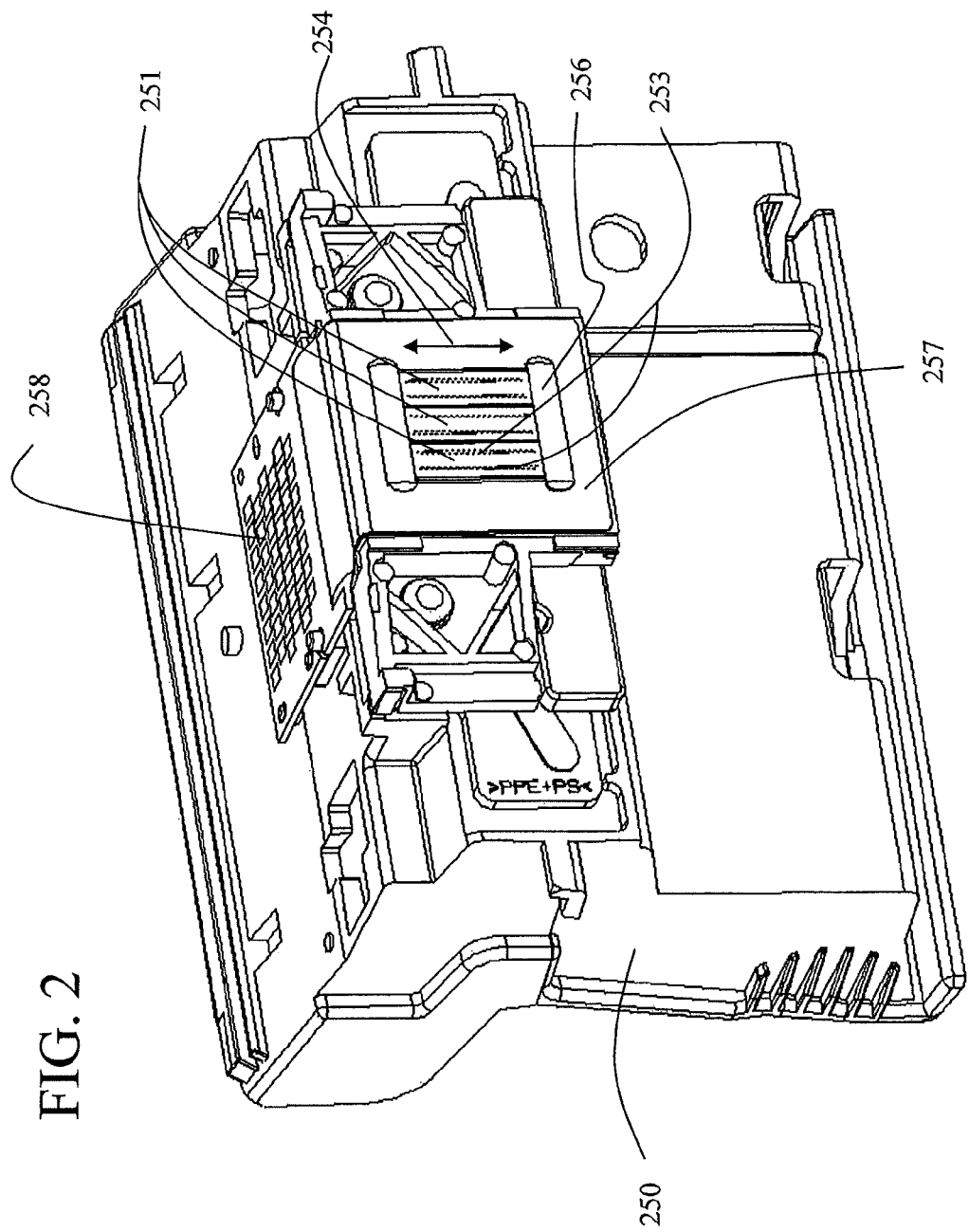
FIG. 2 is a perspective of a portion of a printhead.

FIG. 2 shows a perspective of a portion of a printhead 250, which is an example of an inkjet printhead 100. Printhead 250 includes three printhead die 251 (similar to printhead die 110 in FIG. 1), each printhead die 251 containing two nozzle arrays 253, so that printhead 250 contains six nozzle arrays 253 altogether. The six nozzle arrays 253 in this example can each be connected to separate ink sources (not shown in FIG. 2); such as cyan, magenta, yellow, text black, photo black, and a colorless protective printing fluid. Each of the six nozzle arrays 253 is disposed along nozzle array direction 254, and the length of each nozzle array 253 along the nozzle array direction 254 is typically on the order of 1 inch or less. Typical lengths of recording media are 6 inches for photographic prints (4 inches by 6 inches) or 11 inches for paper (8.5 by 11 inches). Thus, in order to print a full image, a number of swaths are successively printed while moving printhead 250 across the recording medium 20. Following the printing of a swath, the recording medium 20 is advanced along a media advance direction that is substantially parallel to nozzle array direction 254.

Also shown in FIG. 2 is a flex circuit 257 to which the printhead die 251 are electrically interconnected, for example, by wire bonding or TAB bonding. The interconnections are covered by an encapsulant 256 to protect them. Flex circuit 257 bends around the side of printhead 250 and connects to connector board 258. When printhead 250 is mounted into a carriage 200 (see FIG. 3), connector board 258 is electrically connected to a connector (not shown) on the carriage 200, so that electrical signals can be transmitted to the printhead die 251.

Figure 3:
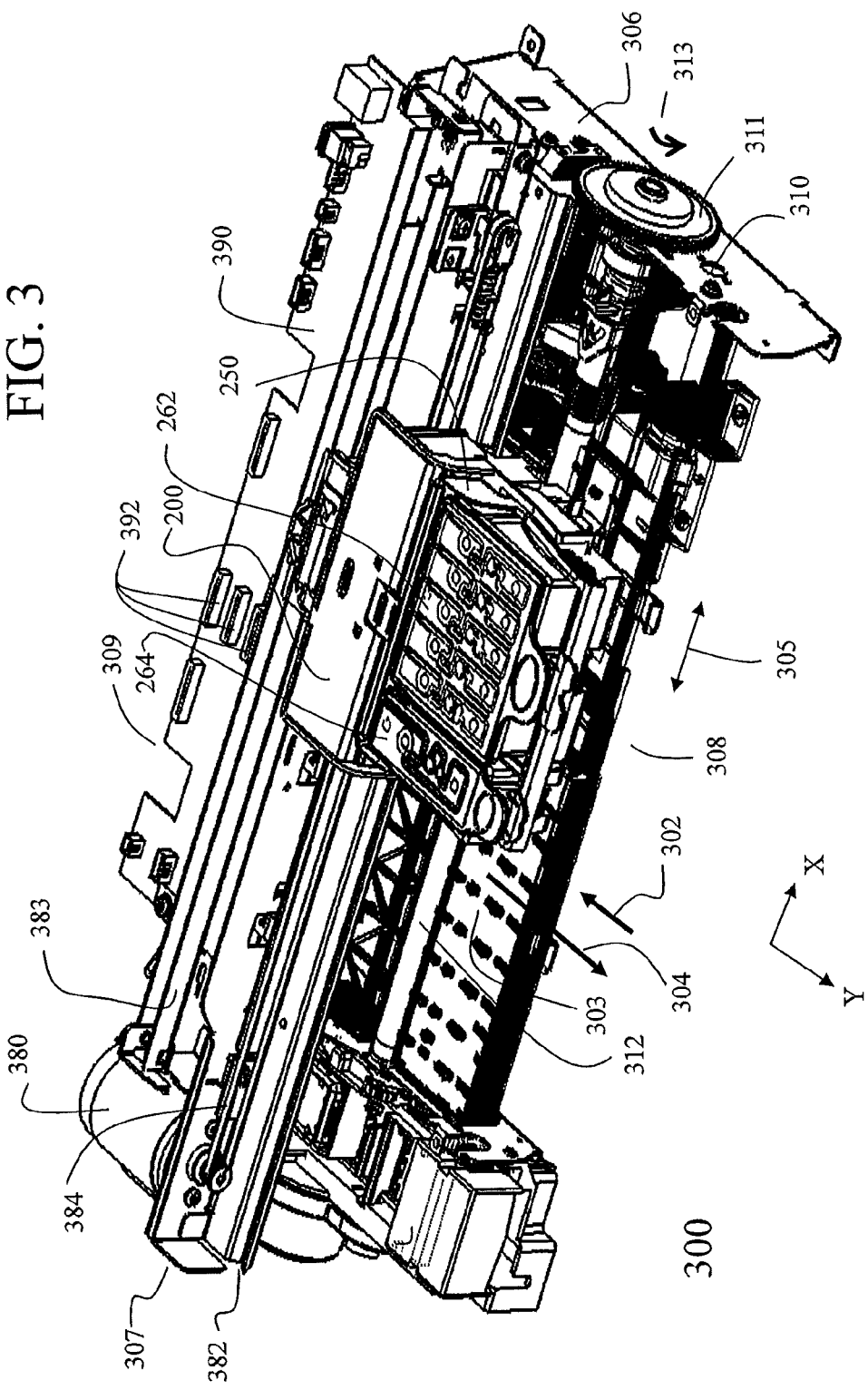
FIG. 3 is a perspective of a portion of a desktop carriage printer.

FIG. 3 shows a portion of a desktop carriage printer. Some of the parts of the printer have been hidden in the view shown in FIG. 3 so that other parts can be more clearly seen. A printing apparatus 300 has a print region 303 across which carriage 200 is moved back and forth in a carriage scan direction 305 along the X axis, between a right side 306 and a left side 307 of printing apparatus 300, while drops are ejected from printhead die 251 (not shown in FIG. 3) on printhead 250 that is mounted on carriage 200. A carriage motor 380 moves belt 384 to move carriage 200 along a carriage guide 382. An encoder sensor (not shown) is mounted on carriage 200 and indicates carriage location relative to an encoder fence 383.

Printhead 250 is mounted in carriage 200, and a multi-chamber ink tank 262 and a single-chamber ink tank 264 are mounted in the printhead 250. The mounting orientation of printhead 250 is rotated relative to the view in FIG. 2, so that the printhead die 251 are located at the bottom side of printhead 250, the droplets of ink being ejected downward onto the recording medium (not shown in FIG. 3) in print region 303 in the view of FIG. 3. Multi-chamber ink tank 262, in this example, contains five ink sources: cyan, magenta, yellow, photo black, and colorless protective fluid; while single-chamber ink tank 264 contains the ink source for text black. Paper or other recording medium (sometimes generically referred to as paper or media herein) is loaded along paper load entry direction 302 toward the front of printing apparatus 308.

The motor that powers the media advance rollers is not shown in FIG. 3, but a hole 310 at the right side of the printing apparatus 306 is where the motor gear (not shown) protrudes through in order to engage feed roller gear 311, as well as the gear for the discharge roller (not shown). A forward direction of rotation 313 is indicated. Toward the rear of printing apparatus 309 is located an electronics board 390, which includes cable connectors 392 for communicating via cables (not shown) to the printhead carriage 200 and from there to the printhead 250. Also on the electronics board 390 are typically mounted motor controllers for the carriage motor 380 and for the paper advance motor, a processor and/or other control electronics (shown schematically as controller 14 and image processing unit 15 in FIG. 1) for controlling the printing process, and an optional connector for a cable to a host computer.

Figure 4:
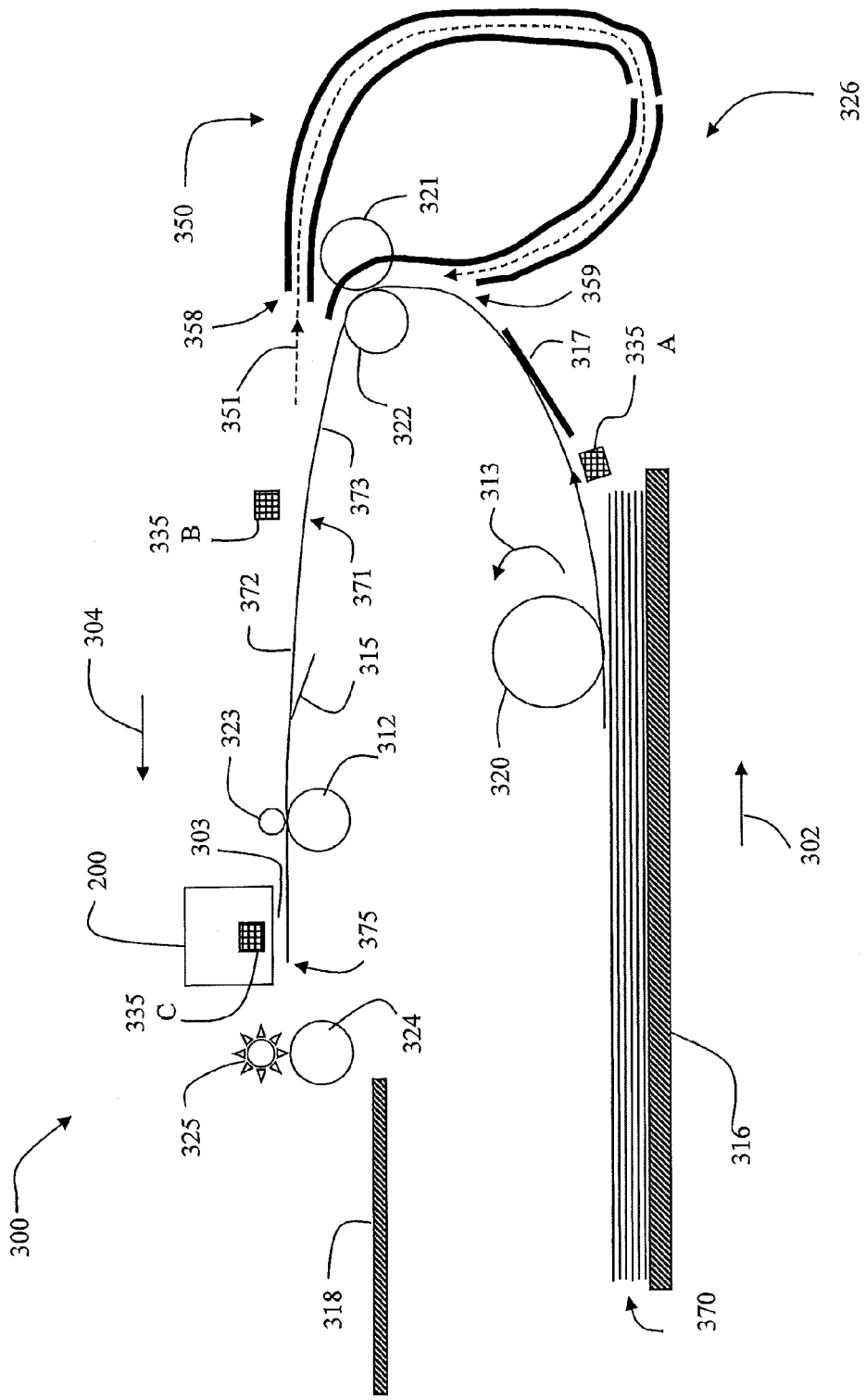
FIG. 4 is a schematic side view of an exemplary printing path in a carriage printer that includes a duplexing unit.

Referring to FIG. 4, the printing apparatus 300 includes a variety of rollers (or other such media transport elements) that are used to advance sheets 371 of a stack 370 of recording medium along a printing path 326 defined as a path from a print media input holder 316 to a print region 303. In the C-shaped paper path example of FIG. 4 (having the appearance of a reversed C from this perspective), a print media input holder 316. A pick roller 320 is driven to rotate in forward rotation direction 313 to advance the top sheet 371 of the stack 370 from print media input holder 316 along paper load entry direction 302 and up inclined guide 317. A turn roller 322 is driven to further advance the sheet 371 received from the pick roller around a C-shaped path (in cooperation with a curved rear wall surface and a pinch roller 321). As a result, the sheet 371 continues to advance along media advance direction 304 from the rear 309 (with reference also to FIG. 3) of printing apparatus 306 toward the print region 303. The sheet 371 is then advanced by a feed roller 312 (driven to rotate in forward rotation direction 313) and an idler roller(s) 323 to advance the lead edge 375 of sheet 371 to and across print region 303 for printing on first side 372 of sheet 371, and from there to a discharge roller 324 and star wheel(s) 325. If the printing is to occur only on first side 372, discharge roller 324 is driven in forward rotation direction 313 to continue to advance sheet 371 along media advance direction 304 until sheet 371 exits into a print media output holder 318, a portion of which is shown. A rotary encoder (not shown) can be coaxially mounted on the feed roller shaft in order to monitor the angular rotation of the feed roller. The media sensor 315 is positioned near feed roller 312 between turn roller 322 and feed roller 312 in order to detect when a sheet 371 is approaching the feed roller 312. In FIG. 4, the sheet 371 has pushed the media sensor 315 down. Also schematically shown in the example of FIG. 4 is a duplexing unit 350 that includes a duplexing media path 351 for reversing the sheet 371 in order to print on a second side 373 of the sheet that is opposite first side 372. As indicated by the arrows on duplexing media path 351, sheet 371 is moved into the entry 358 of duplexing unit 350 by feed roller 312 and is moved out of the exit 359 by turn roller 322. Optionally additional rollers (not shown) can be included in duplexing media path 351 to assist in moving sheets 371.

Embodiments of the invention include a scan element 335 (typically only one scan element 335 is used) in printing path 326. Scan element 335 typically includes a light source (not shown) and a linear photosensor array (not shown). Several alternative locations are shown for scan element 335 in FIG. 4. In location A, scan element 335 is near print media input holder 316. For a C-shaped paper path, stack 370 is loaded printing side (first side 372) facing down into print media input holder 316, since the sheet 371 is turned over by the time it reaches print region 303. Thus a scan element 335 at location A is configured to look at first side 372 while first side 372 is facing downward. By contrast, a scan element 335 at location B (between duplexing unit 350 and print region 303) is configured to look at first side 372 while first side 372 is facing upward. An advantage of location B for scan element 335 is that first side 372 can be scanned as the sheet 371 is fed directly toward print region 303, and then second side 373 can be scanned after the sheet 371 has passed through duplexing unit 350, as shown in the schematic side view of FIG. 5. Scan elements 335 located in either location A or location B are typically configured to extend across the width of a sheet 371 and are mounted in a fixed position. Scanning is done as the sheet 371 is moved past the scan element 335. Alternatively a shorter scan element 335 can be mounted at location C on carriage 200 and moved across the printing path 326 in print region 303 in the same way that the printhead 250 is moved across the printing path 326 in order to print on sheet 371. A short carriage-mounted scan element 335 is less expensive than a page-width scan element 335, but the carriage-mounted scan element 335 requires multiple passes and more time in order to scan an entire side of sheet 371.

Scanning for Previous Marks and Then Printing

In a first family of embodiments, controller 14 (FIG. 1) includes a first selectable printing mode intended for printing on previously used recording medium and a second selectable printing mode intended for printing on recording medium that has not previously been marked on. The first selectable printing mode includes using the scan element to determine whether a first side of a sheet of recording medium has marks on it, and printing on the first side of the sheet if it is determined that the first side does not have marks on it. Determining whether the first side of the sheet already has marks on it is helpful if previously used recording medium has been loaded into the printer. However, such a printing mode requires additional processing time and is not needed if previously unmarked recording medium has been loaded in the printer. The second selectable printing mode does not include determining whether the sheet of recording medium has marks it, and is similar to conventional printing modes.

Figure 5:
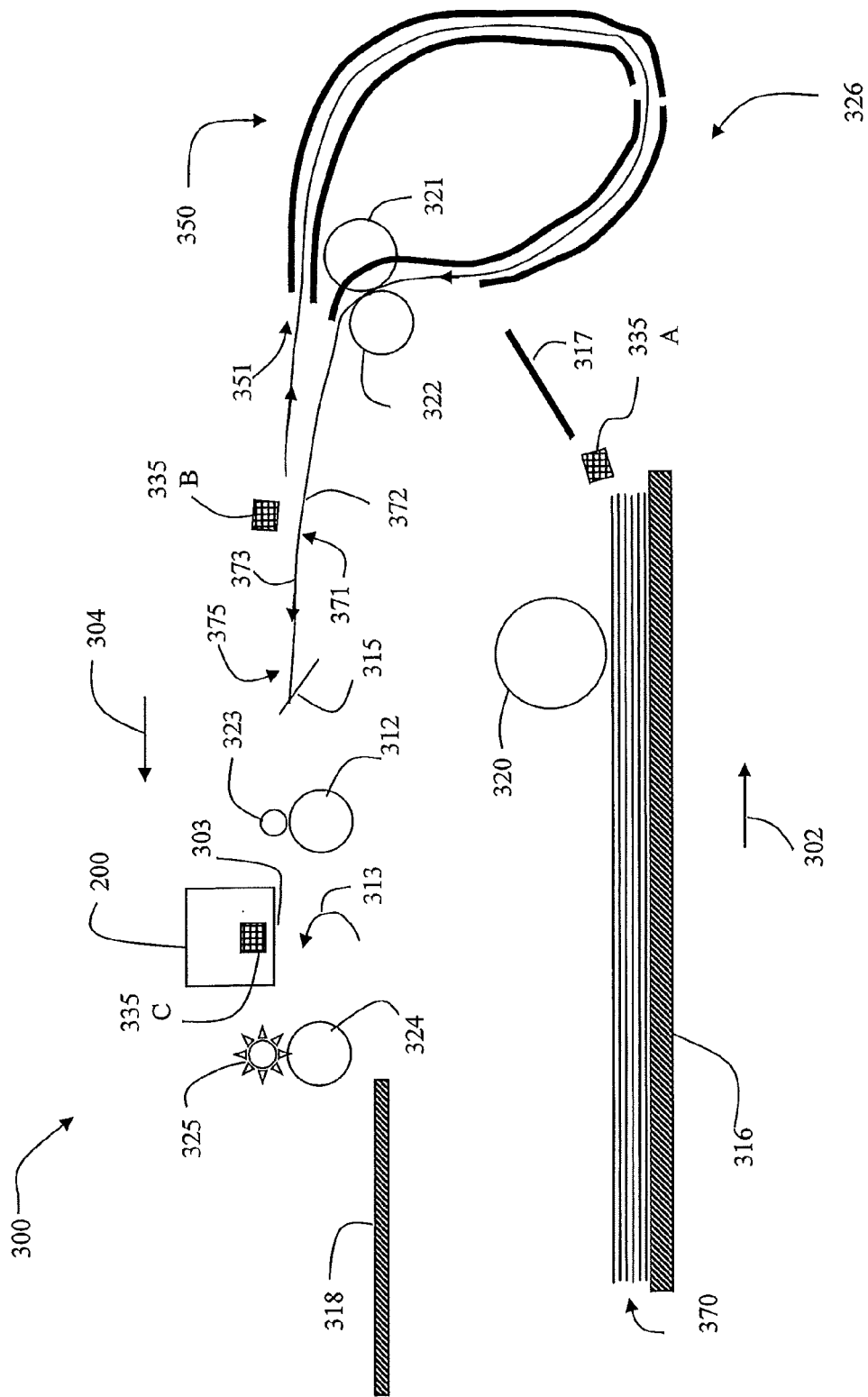
FIG. 5 is a schematic side view of the printing path of FIG. 4, where the lead edge of the sheet has exited the duplexing unit and is approaching the print region.
Figure 6:
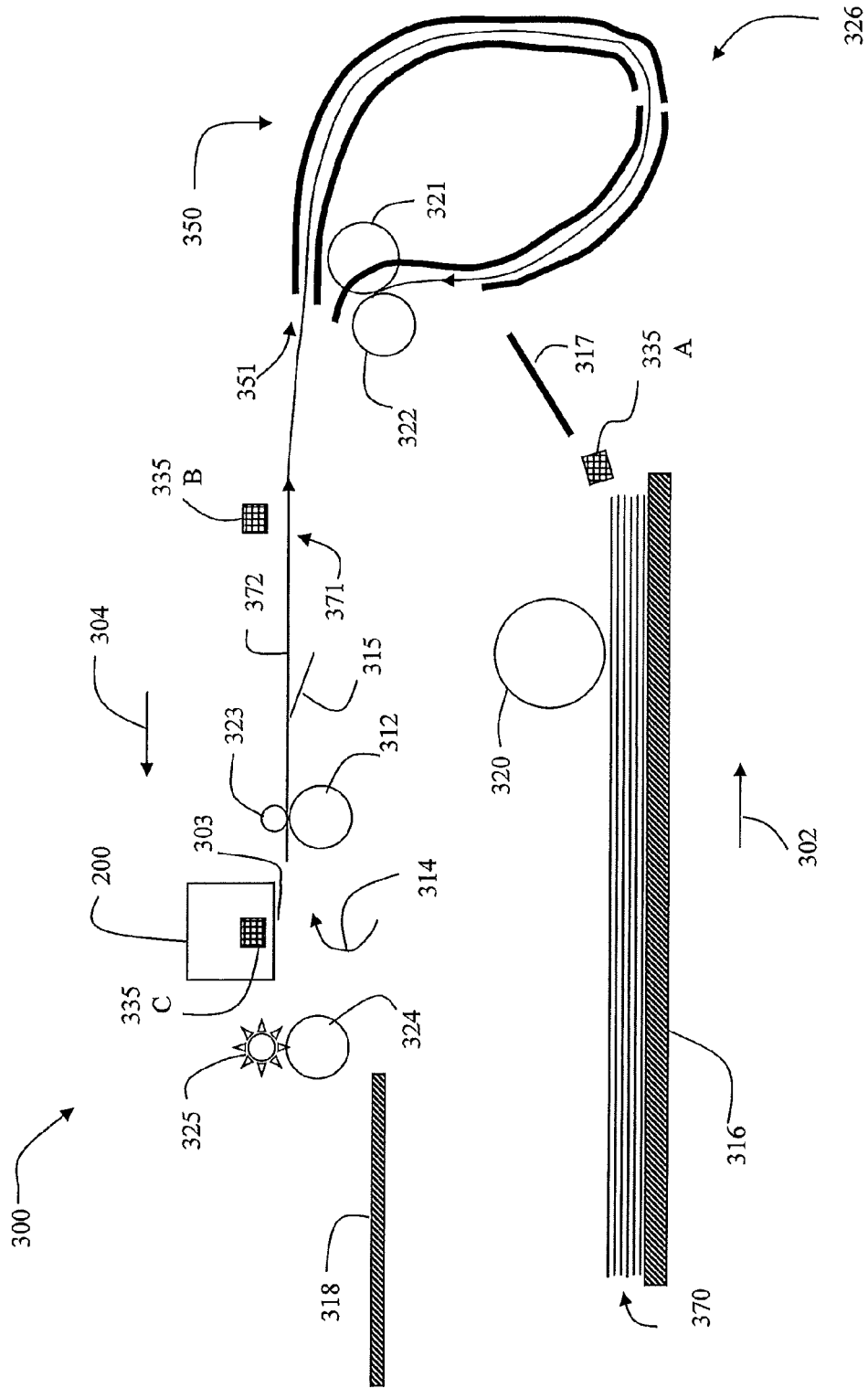
FIG. 6 is a schematic side view of the printing path of FIG. 4, where one side of the sheet has been printed and the sheet is travelling toward the duplexing unit.

A method for implementing the first selectable printing mode will next be described with reference to FIGS. 4-6. The user loads a stack of previously used recording medium into print media input holder 316 and selects the first selectable printing mode, for example by pressing a button. The printer controller 14 (FIG. 1) recognizes that a media scan mode has been selected. Printer controller 14 sends instructions to scan element 335 in the printing path 326 (for example typically located in positions A, B, or C) to scan a first side 372 of a sheet 371 of recording medium in order to provide scan data. The scan data is then analyzed to determine whether the first side 372 has previously been marked on. Such marks can include printed marks or handwritten marks, for example. Recording media, particularly from a recycling storage unit, can have minor imperfections or dust on it, such that printing on a side having minor imperfections is still satisfactory. Analyzing the scan data (e.g. in controller 14) can compare the scan data to a predetermined threshold for detection of marks such that marks having a size or contrast relative to the background of the recording medium that exceed the threshold are included for the purpose of determining whether the first side 372 has previously been marked on. If it is determined via the analyzed scan data that the first side has not previously been marked on (i.e. not marked on to an extent that would detract from a newly printed image), then the sheet 371 is advanced to the print region 303, as shown in FIG. 4, and an image of current interest is printed on first side 372. However, if it is determined via the analyzed scan data that the first side has previously been marked on (i.e. has been marked on to an extent that would detract from a newly printed image), then the sheet 371 of recording medium is turned over and advanced into print region 303 so that the image can be printed on second side 373. FIGS. 5 and 6 illustrate how sheet 371 can be turned over with the use of duplexing unit 350. In FIG. 6, feed roller 312 is driven to rotate in reverse rotation direction 314 to move sheet 371 toward and through duplexing unit 350.

In FIG. 5 (which occurs after FIG. 6 in the printing sequence) lead edge 375 of sheet 371 has moved all the way through the duplexing media path 351 and is being advanced by turn roller 322 toward feed roller 312. When lead edge 375 reaches media sensor 315, media sensor 315 is pushed down by sheet 371. The direction of rotation of feed roller 312 is then changed from reverse rotation direction 314 to forward rotation direction 313 in order to advance lead edge 375 of sheet 371 to print region 303 in order to print second side 373. Optionally for a scanning element located at positions B or C, second side 373 can also be scanned prior to printing an image on second side 373 in order to determine whether second side 373 has previously been marked on. In embodiments where the scanning element 335 is located at positions A or B, scanning and printing can occur concurrently. If printing has begun on a side of sheet 371 and it is determined that side has been previously marked on, printing can be terminated. Since the distance between positions A or B and print region 303 can be several inches, in many cases if no marks have been found prior to the first portion to be printed of sheet 371 reaching print region 303, chances are good that it will be found that the side has not previously been marked on. In some embodiments or selectable printing modes, it is assumed that at most only one side of the stack of recording media has previously been marked on and printing on second side 373 of sheet 371 occurs immediately after passing the sheet 371 through duplexing unit 350 without scanning second side 373.

Using a Scan Element in the Printing Path to Sort a Stack of Media

In a second family of embodiments, controller 14 (FIG. 1) includes a selectable media sort mode intended for sorting a stack of previously used recording medium and a selectable printing mode intended for printing on recording medium that has not previously been marked on. Rather than scanning and printing a sheet at a time, an entire stack of previously used media can be sorted in a continuous operation by using the scan element 335 in printing path 326 (FIG. 4). The sorting operation can be done at a time when the printer is not in the process of printing a print job, so that the sorting does not slow down printing throughput. The media sort mode includes using the scanning element 335 to determine whether a sheet 371 of recording medium has marks on a first side 372 of the recording medium as described above. The sheet of recording medium is then moved to a first location or a second location depending on whether the first side 372 of the sheet 371 is determined to have marks on it. For example, if the first side 372 of the sheet 371 is determined to have marks on it, the sheet can be moved to a first location that includes a duplexing unit 350, as described above so that sheet 371 can be turned over and then moved to print media output holder 318. If the first side 372 of sheet 371 is determined not to have marks on it, sheet 371 can be moved directly to print media output holder 318 as a second location. This can be repeated sheet by sheet until the entire stack 370 is sorted. Alternatively, if the selectable printing mode is selected, printing does not include determining whether the sheet of recording medium has marks it, and is similar to conventional printing modes.

Figure 7:
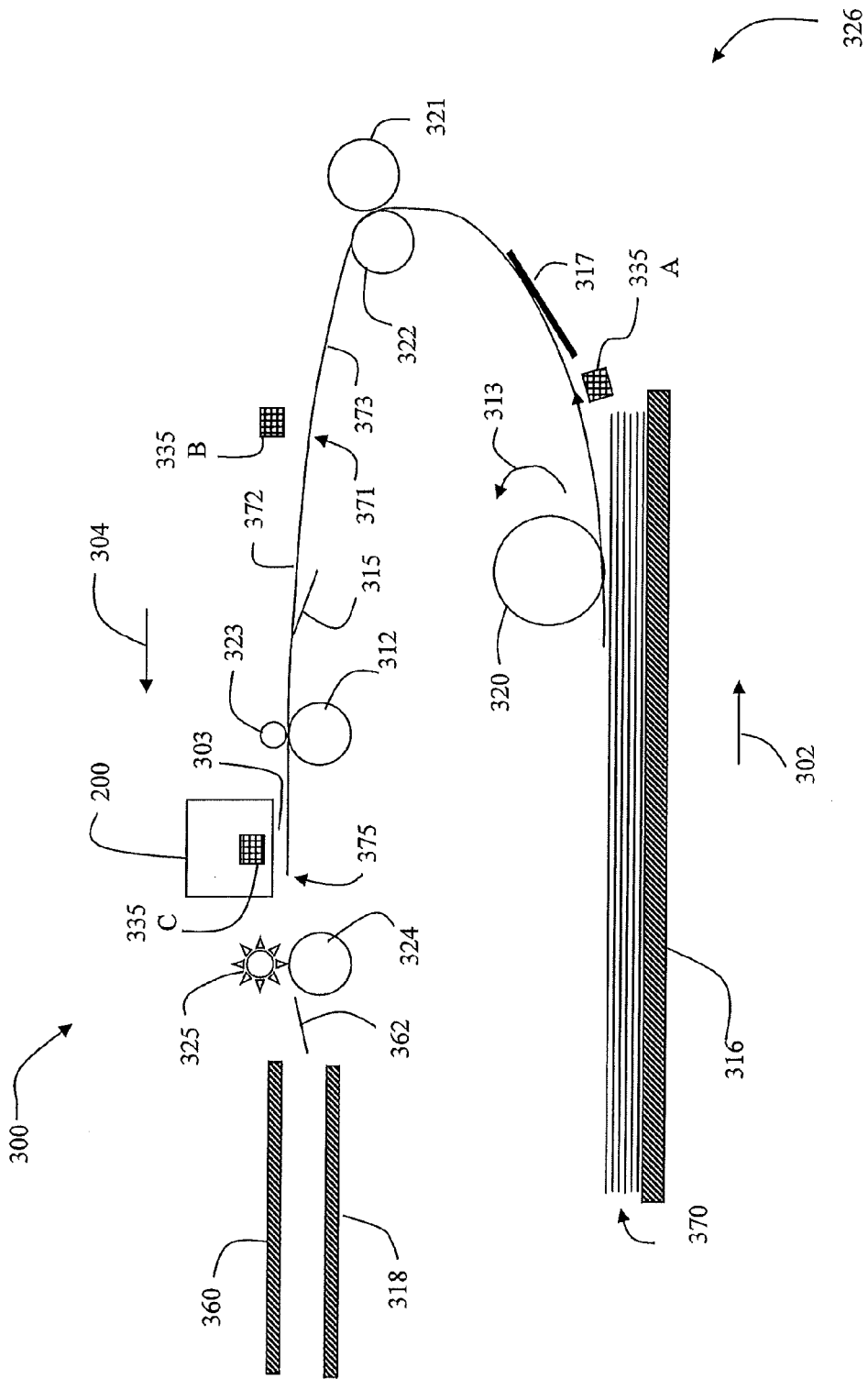
FIG. 7 is a schematic side view of a printing path of a printing apparatus having a media sorting holder.

Alternatively for the media sorting mode, printing apparatus 300 can include a sorted media holder 360 and a gate 362, as shown in FIG. 7 to direct sheet 371 into sorted media holder 360, as a first location, if it is determined that first side 372 has marks on it or into print media output holder 318, as a second location, if it is determined that first side 372 does not have marks on it. This can be repeated sheet by sheet until the entire stack 370 is sorted.

Methods of implementing the media sorting mode will next be described. The user loads a stack of previously used recording medium into print media input holder 316 and selects the media sort mode, for example by pressing a button. The printer controller 14 (FIG. 1) recognizes that a media sort mode has been selected. Printer controller 14 sends instructions to scan element 335 in the printing path 326 (for example located in positions A, B, or C) to scan a first side 372 of a sheet 371 of recording medium in order to provide scan data. The scan data is then analyzed to determine whether the first side 372 has previously been marked on. Analyzing the scan data (e.g. in controller 14) can include comparing the scan data to a predetermined threshold for detection of marks such that marks having a size or contrast relative to the background of the recording medium that exceed the threshold are included for the purpose of determining whether the first side 372 has previously been marked on. If it is determined via the analyzed scan data that the first side 372 has previously been marked on, then the sheet 371 is moved to a first location that can include a duplexing unit 350 as shown in FIGS. 4-6 for turning over prior to moving the sheet 371 to print media output holder 318.

In an alternative embodiment in which there is not a duplexing unit 350 as shown in FIG. 7, the first location can correspond to a sorted media holder 360. If it is determined via the analyzed scan data that the first side has not previously been marked on, then the sheet 371 of recording medium is moved directly to the print media output holder 318 as a second location.

The sorting steps are repeated for each successive sheet in the randomly oriented stack 370 of recording media. For embodiments where a duplexing unit 350 (FIGS. 4-6) turns over sheets determined to have marks on the first side 372 prior to moving the sheets to the print media output holder 318, the print media output holder 318 at the end of the process includes a stack of media with unmarked first sides 372 facing a first direction, and marked first sides 372 facing a second direction opposite the first direction. If the original stack 370 contained no sheets that had previously been marked on both sides, then the sorted stack in print media output holder 318 will have only unmarked sides pointing in the first direction.

For embodiments where printing apparatus 300 includes a sorted media holder 360 (FIG. 7), after the sorting steps are repeated for each successive sheet in the randomly oriented stack 370, sorted media holder 360 includes a first set of sheets that were previously marked on first side 372. Print media output holder 318 includes a second set of sheets that were previously unmarked on first side 372. Optionally, the first set of sheets can be turned over and reloaded into the print media input holder 316 for a repeated scan of the first set of sheets. At the end of the repeated scan, a group of sheets is in sorted media holder 360 such that each sheet in the group has previously been marked on both sides. Such sheets can be removed from the printer and not used for printing. Sheets in the print media output holder 318 (whether from the first scan of the entire stack or from the repeated scan of the first set of sheets) can be loaded into the print media input holder 316 for subsequent printing. Printing apparatus 300 can provide instructions to the user for the sorting operations described above. In particular, printing apparatus 300 can display instructions (on a display not shown) to turn over the first set of sheets and place the turned over set of sheets in print media input holder 316. In addition, printing apparatus 300 can display instructions to place the second set of sheets into print media input holder 316 for subsequent printing. Printing apparatus 300 can also provide statistics to the user indicating how many sheets of paper are prepared for reuse. These statistics can be provided as numbers of sheets, or in other units such as "trees saved." Such statistics can be provided for each sorting event, or optionally on a cumulative basis over the life of the printer.

Some users load unused recording medium into print media input holder 316 on some occasions and previously used recording medium on other occasions. As a result, print media input holder 316 can include a mixture of unused and previously used recording medium. For some types of print jobs a user does not care whether unused or previously used recording medium is utilized. For other types of print jobs (such as for printing of legal documents or for printing in a duplex print mode), the user only wants to print on recording medium that has not previously been marked on. A selectable media screening mode can also be provided in which both sides of the sheets 371 are scanned in order to identify sheets that have not previously been marked on either side. For example, in a printing apparatus 300 including a sorted media holder 360 (FIG. 7) as described above, the second set of sheets 371 (that have not previously been marked on first side 372) in print media output holder 318 can be turned over and rescanned to determine whether second side 373 has previously been marked on. Sheets 371 that are delivered to print media output holder 318 after the second scan are determined not to have been previously marked on either first side 372 or second side 373.

Indicating that a Side of a Sheet has Previously been Marked

In a third family of embodiments, a first side 372 of a sheet 371 of recording medium from a randomly oriented stack 370 is scanned using scanning element 335 in printing path 326. If analysis of the scan data determines that the first side 372 has previously been marked on, with marks 400 as shown in FIG. 8A, sheet 371 is moved to print region 303 and a predetermined indicator 410 is printed on first side 372 as shown in FIG. 8B. The purpose of the predetermined indicator 410 is to alert the user and subsequent recipients of the printed image that the side with the predetermined indicator 410 is not currently of interest. The predetermined indicator 410 can include a marking, such as an X, or text such as "Disregard this side" or "I saved a tree," or a machine-readable indicator such as a bar code. A marking such as an X can either be small enough that it can be printed quickly in a single swath, or it can be large enough to cover a significant portion of the page. Optionally, the predetermined indicator 410 can be user-specified. The predetermined indicator 410 can be made in a predetermined location, such as a lower margin as in FIG. 8B, so that the user and other recipients will know where to look. The predetermined indicator 410 can be selected and positioned such that it will be readily visible. In addition, the scan data from the first side of the sheet can be used to ensure that the predetermined indicator 410 is noticeable. For example, the scan data can indicate whether any of the previous marks are located near the predetermined location intended for the predetermined indicator 410. The scan data can detect a predominantly used color on the first side of the sheet near the predetermined location (whether from marks or from colored recording media) and controller 14 (FIG. 1) can control the printing of the predetermined indicator 410 to be in a color that is different from the predominantly used color. For example, the color of the predetermined indicator 410 can be selected to contrast with the predominantly used color. The shape of the predetermined indicator 410 can also be selected for visibility.

The color of the predetermined indicator can also be selected based on ink utilization. The predetermined indicator can be printed using inks that are historically or currently underutilized. The indicator can be printed avoiding use of ink colors that are nearing depletion.

For a printing apparatus having a duplexing unit 350, as in FIGS. 4-6, after printing the predetermined indicator on the first side 372 of a sheet 371 where the first side 372 was determined to have previously been marked on, duplexing unit 350 can turn sheet 371 over. Image data (corresponding to text, graphs, pictures or other types of image content) can then be used to print an image of current interest on the second side 373 of sheet 371. Optionally, for a printing apparatus having a scan element 335 in a location such as B or C, as well as a duplexing unit 350, after turning over the sheet 371, scanning element 335 can be used to scan second side 373 to determine whether second side 373 has previously been marked on. If second side 373 has also been previously marked on, a predetermined indicator can be printed on second side 373. The predetermined indicator printed on second side 373 can be the same as the predetermined indicator printed on first side 372, or it can be different. For example, the predetermined indicator on the second side can be a different color or contain a different message (such as "Disregard both sides").

Even for a printing apparatus that does not have a duplexing unit 350 (FIGS. 4-6), or a sorted media holder 360 (FIG. 7), the printing of a predetermined indicator on a previously marked side can be useful. For example, sheets that are found to have been marked can be printed with the predetermined indicator such as "use other side" and ejected into the print media output holder 318. The user still has to check through the printed output and remove or reorient sheets that have the predetermined indicator marked on them, but the desired image will still have been printed on a previously unmarked side of a sheet.

The invention has been described in detail with particular reference to certain preferred embodiments thereof, but it will be understood that variations and modifications can be effected within the spirit and scope of the invention. In particular, although embodiments were described with regard to inkjet printers, the invention is applicable to other types of printing apparatus as well.

PARTS LIST

10 Inkjet printer system
12 Image data source
14 Controller
15 Image processing unit
16 Electrical pulse source
18 First fluid source
19 Second fluid source
20 Recording medium
100 Inkjet printhead
110 Inkjet printhead die
111 Substrate
120 First nozzle array
121 Nozzle(s)
122 Ink delivery pathway (for first nozzle array)
130 Second nozzle array
131 Nozzle(s)
132 Ink delivery pathway (for second nozzle array)
181 Droplet(s) (ejected from first nozzle array)
182 Droplet(s) (ejected from second nozzle array)
200 Carriage
250 Printhead
251 Printhead die
253 Nozzle array
254 Nozzle array direction
256 Encapsulant
257 Flex circuit
258 Connector board
262 Multi-chamber ink tank
264 Single-chamber ink tank 300 Printing apparatus
302 Paper load entry direction
303 Print region
304 Media advance direction
305 Carriage scan direction
306 Right side of printing apparatus
307 Left side of printing apparatus
308 Front of printing apparatus
309 Rear of printing apparatus
310 Hole (for paper advance motor drive gear)
311 Feed roller gear
312 Feed roller
313 Forward rotation direction (of feed roller)
314 Reverse rotation direction (of feed roller)
315 Media sensor
316 Print media input holder
317 Inclined guide
318 Print media output holder
320 Pick roller
321 Pinch roller
322 Turn roller
323 Idler roller
324 Discharge roller
325 Star wheel(s)
326 Printing path
335 Scan element
350 Duplexing unit
351 Duplexing media path
358 Entry (to duplexing unit)
359 Exit (from duplexing unit)
360 Media sorting holder
362 Gate
370 Stack
371 Sheet
372 First side (of sheet)
373 Second side (of sheet)
375 Lead edge (of sheet)
380 Carriage motor
382 Carriage guide
383 Encoder fence
384 Belt
390 Electronics board
392 Cable connectors
400 Marks
410 Predetermined indicator

The invention claimed is:

1. A method of printing on a sheet of recording medium included in a randomly oriented stack of recording media provided to a printing apparatus, the method comprising:
using a scanning element disposed in a printing path of the printing apparatus to scan a first side of the sheet of recording medium to provide scan data;
analyzing the scan data to determine whether the first side has previously been marked on; and
making a predetermined indicator on the first side of the sheet of recording medium if it is determined that the first side has previously been marked on;
wherein making the predetermined indicator further comprises making the predetermined indicator in a predetermined location;
wherein scanning the first side of the sheet further includes determining whether the first side has previously been marked in a region near the predetermined location.

2. The method according to claim 1 further comprising:
turning the sheet of recording medium over if the first side has previously been marked on;
providing image data to the printing apparatus; and
printing an image corresponding to the image data on a second side of the sheet of recording medium.

3. The method according to claim 1, wherein scanning the first side of the sheet further includes detecting a predominantly used color on the first side of the sheet near the predetermined location, and wherein making the predetermined indicator further includes making the predetermined indicator in a color that is different from the predominantly used color.

4. The method according to claim 1 further comprising:
turning the sheet of recording medium over if the first side has previously been marked on;
using the scanning element disposed in the printing path of the printing apparatus to scan a second side of the sheet of recording medium to provide scan data;
analyzing the scan data to determine whether the second side has previously been marked on; and
making a predetermined indicator on the second side of the sheet of recording medium if the second side has previously been marked on.

5. A method of printing on a sheet of recording medium included in a randomly oriented stack of recording media provided to a printing apparatus, the method comprising:
using a scanning element disposed in a printing path of the printing apparatus to scan a first side of the sheet of recording medium to provide scan data;
analyzing the scan data to determine whether the first side has previously been marked on; and
making a predetermined indicator on the first side of the sheet of recording medium if it is determined that the first side has previously been marked on;
wherein scanning the first side of the sheet further includes detecting a predominantly used color on the first side of the sheet, and wherein making the predetermined indicator further includes making the predetermined indicator in a color that is different from the predominantly used color.

6. The method according to claim 5, wherein making the predetermined indicator in a color that is different from the predominantly used color includes selecting a color that contrasts with the predominantly used color.

7. The method according to claim 5 further comprising ejecting the sheet of recording medium after the predetermined indicator has been made on the first side of the sheet.

8. The method according to claim 5 further comprising:
turning the sheet of recording medium over if the first side has previously been marked on;
providing image data to the printing apparatus; and
printing an image corresponding to the image data on a second side of the sheet of recording medium.

9. The method according to claim 5, wherein the predetermined indicator is machine-readable.

10. The method according to claim 5 further comprising:
turning the sheet of recording medium over if the first side has previously been marked on;
using the scanning element disposed in the printing path of the printing apparatus to scan a second side of the sheet of recording medium to provide scan data;
analyzing the scan data to determine whether the second side has previously been marked on; and
making a predetermined indicator on the second side of the sheet of recording medium if the second side has previously been marked on.

11. The method according to claim 10, wherein making the predetermined indicator on the second side of the sheet includes making a predetermined indicator that is different from the predetermined indicator made on the first side of the sheet.

12. A method of printing on a sheet of recording medium included in a randomly oriented stack of recording media provided printing apparatus, the method comprising:
using a scanning element disposed in a printing path of the printing apparatus to scan a first side of the sheet of recording medium to provide scan data;
analyzing the scan data to determine whether the first side has previously been marked on;
making a predetermined indicator on the first side of the sheet of recording medium if it is determined that the first side has previously been marked on; and
using a user-specified configuration of the predetermined indicator.

13. The method according to claim 12, wherein the user-specified predetermined indicator includes text.

14. The method according to claim 1, wherein the predetermined indicator is machine-readable.

15. The method according to claim 4, wherein making the predetermined indicator on the second side of the sheet includes making a predetermined indicator that is different from the predetermined indicator made on the first side of the sheet.

16. The method according to claim 12, wherein making the predetermined indicator further includes selecting a color based on based on ink utilization.

17. The method according to claim 12 further comprising:
turning the sheet of recording medium over if the first side has previously been marked on;
providing image data to the printing apparatus; and
printing an image corresponding to the image data on a second side of the sheet of recording medium.

18. The method according to claim 12, wherein the predetermined indicator is machine-readable.

19. The method according to claim 12 further comprising:
turning the sheet of recording medium over if the first side has previously been marked on;
using the scanning element disposed in the printing path of the printing apparatus to scan a second side of the sheet of recording medium to provide scan data;
analyzing the scan data to determine whether the second side has previously been marked on; and
making a predetermined indicator on the second side of the sheet of recording medium if the second side has previously been marked on.

20. The method according to claim 19, wherein making the predetermined indicator on the second side of the sheet includes making a predetermined indicator that is different from the predetermined indicator made on the first side of the sheet.

* * * * *